United States Patent
Asano et al.

(10) Patent No.: US 10,096,135 B2
(45) Date of Patent: *Oct. 9, 2018

(54) IMAGE PROCESSING LSI AND IMAGE PROCESSING PROGRAM

(71) Applicant: RENESAS ELECTRONICS CORPORATION, Tokyo (JP)

(72) Inventors: Shinichi Asano, Tokyo (JP); Osamu Nakamura, Tokyo (JP); Shinji Yamano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,652

(22) Filed: May 1, 2017

(65) Prior Publication Data

US 2017/0236310 A1   Aug. 17, 2017

Related U.S. Application Data

(63) Continuation of application No. 14/191,171, filed on Feb. 26, 2014.

(30) Foreign Application Priority Data

Feb. 26, 2013 (JP) ................. 2013-035459

(51) Int. Cl.
  *G06T 11/20* (2006.01)
  *G06T 11/00* (2006.01)
  *G09G 5/393* (2006.01)

(52) U.S. Cl.
  CPC .......... *G06T 11/203* (2013.01); *G06T 11/206* (2013.01); *G09G 5/393* (2013.01); *G09G 2360/127* (2013.01); *G09G 2360/18* (2013.01)

(58) Field of Classification Search
  CPC ...... G06T 11/00; G06T 11/203; G06T 11/206; G06T 1/20; G06T 15/005; G09G 5/393;
  (Continued)

(56) References Cited

U.S. PATENT DOCUMENTS 6,177,934 B1 * 1/2001 Sugiura ............. H04N 1/00236
                                                    715/748
6,321,266 B1 * 11/2001 Yokomizo .......... H04N 1/32358
                                                    358/400
(Continued)

FOREIGN PATENT DOCUMENTS

CN         1811819 A      8/2006
JP      H10-337932 A     12/1998
(Continued)

OTHER PUBLICATIONS

U.S. Notice of Allowance dated Jan. 30, 2017 issued in U.S. Appl. No. 14/191,171.

(Continued)

*Primary Examiner* — Chante Harrison
(74) *Attorney, Agent, or Firm* — McDermott Will & Emery LLP

(57) ABSTRACT

When graphics computations are to be performed to calculate the display data of a figure to be drawn within a frame that is formed of a plurality of lines in accordance with input vector data, the present invention reduces the storage capacity of a RAM to which a work area for storing intermediate data is allocated. When the graphics computations are to be performed, the frame in which the figure is to be displayed is segmented into a plurality of drawing areas for each of the lines. As regards the work area for storing the intermediate data, the same work area is allocated to all the drawing areas. The graphics computations for calculating the intermediate (Continued)

data of the individual drawing areas are sequentially performed by repeatedly using the same work area.

3 Claims, 6 Drawing Sheets

(58) Field of Classification Search
CPC ......... G09G 2360/127; G09G 2360/18; G09G 5/363
See application file for complete search history.

(56) References Cited

U.S. PATENT DOCUMENTS

| | | | |
|---|---|---|---|
| 8,411,949 B2 | 4/2013 | Kuroki et al. | |
| 2004/0013316 A1 | 1/2004 | Park et al. | |
| 2006/0164419 A1 | 7/2006 | Nishi | |
| 2006/0188236 A1 | 8/2006 | Kitagawa | |
| 2012/0013938 A1* | 1/2012 | Nogawa | H04N 1/40 358/1.15 |
| 2013/0335779 A1 | 12/2013 | Ito | |
| 2014/0071463 A1 | 3/2014 | Achiwa | |
| 2014/0292756 A1 | 10/2014 | Mantor et al. | |
| 2015/0062136 A1 | 3/2015 | Yamauchi | |
| 2015/0381852 A1 | 12/2015 | Ito | |

FOREIGN PATENT DOCUMENTS

| | | |
|---|---|---|
| JP | 2011-053944 A | 3/2011 |
| JP | 2011-158951 A | 8/2011 |

OTHER PUBLICATIONS

Japanese Office Action dated Jun. 9, 2016 issued in Japanese Patent Application No. 2013-035459 (English translation).
U.S. Non-Final Office Action dated Aug. 1, 2016 issued in U.S. Appl. No. 14/191,171.
U.S. Non-Final Office Action dated Mar. 4, 2016 issued in U.S. Appl. No. 14/191,171.
Chinese Office Action dated Sep. 27, 2017 issued in Chinese Patent Application No. 2014100648230 (with English translation).

* cited by examiner

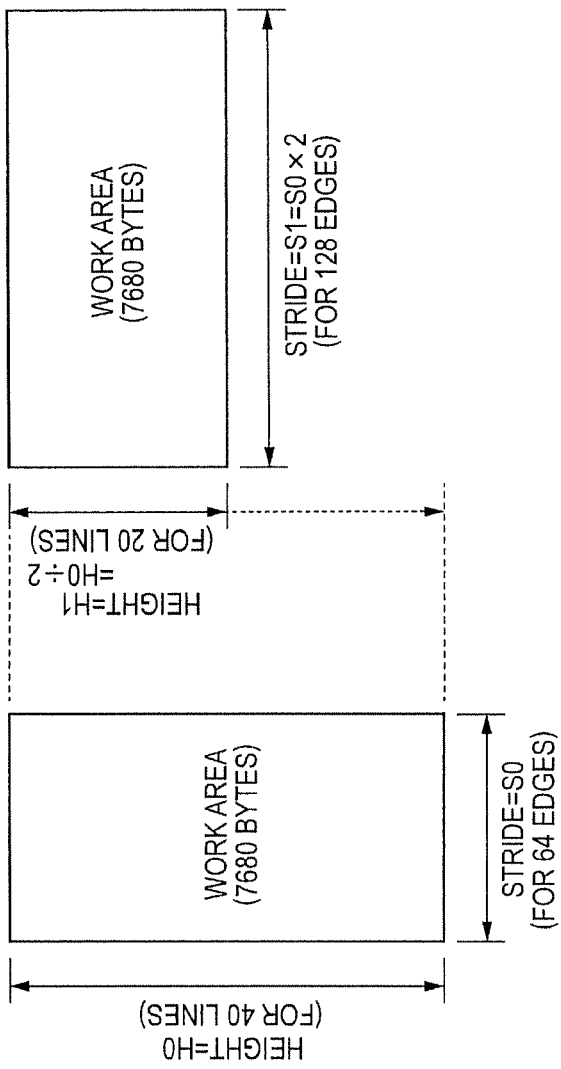

IMAGE PROCESSING LSI AND IMAGE PROCESSING PROGRAM

CROSS-REFERENCE TO RELATED APPLICATIONS

This application is a continuation application of U.S. patent application Ser. No. 14/191,171 filed on Feb. 26, 2014, which claims the benefit of Japanese Patent Application No. 2013-035459 filed on Feb. 26, 2013 including the specification, drawings, and Abstract is incorporated herein by reference in their entireties.

BACKGROUND

The present invention relates to an image processing LSI (Large-Scale Integrated circuit) for performing graphics computations and to an image processing program that operates using the image processing LSI. Particularly, the present invention is suitable for use in limiting the storage capacity of the work area of a RAM (Random Access Memory) used for graphics computations.

When a graphics drawing process is performed by an image processing LSI, drawing data of many line segments and simple figures are synthesized to obtain a desired image and display the obtained image on a display device. The line segments and figures, which are elements of a drawing, are expressed by parameters called vector data that includes, for example, a curvature and the coordinates of vertex or other feature point. In graphics computations, for each of many line segments and figures forming an image within a frame, the drawing data to be drawn on each pixel within the frame is calculated from the vector data, and the drawing data of all the line segments and figures are combined in a frame buffer to calculate display data to be displayed on the display device on an individual frame basis. The display data represents the luminance or the luminance and color difference of each of three primary colors and is stored in the frame buffer.

An image processing device for performing the above-described graphics drawing process is generally configured by disposing a ROM (Read Only Memory) and a RAM external to the image processing LSI. The external ROM stores the vector data. The external RAM is allocated as the frame buffer. The drawing data, which is intermediate data in graphics computations, is also stored in a work area defined in the external RAM.

A technology disclosed in Japanese Unexamined Patent Publication No. 2011-158951 suppresses an increase in memory usage when a rasterization process is performed by a plurality of arithmetic elements. When rasterizing the intermediate data that is generated on an individual band basis in accordance with page description language data, the disclosed technology generates a plurality of segmented areas by segmenting a band, which has a plurality of cores (arithmetic elements) and forms each set of intermediate data, into a plurality of sections, and assigns the segmented areas to the individual cores to perform the rasterization process.

SUMMARY

When related art technologies disclosed, for instance, in Japanese Unexamined Patent Publication No. 2011-158951 were studied, the inventors of the present invention found a new problem, which is described below.

As described above, the drawing data, which is the intermediate data in graphics computations, is stored in the work area of the RAM, which is used for graphics computations. A primary means for complying with the specifications for OpenVG, which is one of the API (Application Program Interface) standards of the industry for 2D vector graphics, foists the intermediate data that includes the coordinates of all edges of line segments and figures in each line. The intermediate data of each of a plurality of line segments or figures within a frame is stored in the work area. One frame of intermediate data of one line segment or figure has a size that is determined by multiplying the data capacity per line, which is determined by the maximum number of edges per line, by the number of lines per frame. The primary means for complying with the specifications for OpenVG uses Equation (1) below to calculate the size per line. Further, when, for instance, an anti-aliasing process is to be added, the storage capacity required for the work area per frame is calculated by Equation (2) below:

$$\text{Size per line} = 8 \text{ bytes} + (\text{maximum number of edges} \times 2 \text{ bytes}) \quad (1)$$

$$\text{Storage capacity of work area} = \text{size per line} \times \text{number of vertical lines} \times 4 \quad (2)$$

where the number of vertical lines is the number of lines forming one frame.

In a situation where the size of the image to be displayed is 480×800 Wide VGA, the size per line is 144 bytes when, for instance, the maximum number of edges is 68. If, in this instance, allocation is performed in units of 64 bytes due to the configuration of the RAM, the size per line is 192 bytes. As the number of vertical lines for Wide VGA is 480, the storage capacity required for the work area is 368,640 bytes (360 kilobytes). The storage capacity required for the work area increases with an increase in the resolution of the image to be displayed.

A storage capacity of approximately 360 kilobytes does not cause a significant problem for the external RAM. However, it becomes problematic when the RAM is integrated on the same chip as the image processing LSI.

The technology disclosed in Japanese Unexamined Patent Publication No. 2011-158951 prevents an increase in memory usage when the rasterization process is performed. The rasterization process is a process for calculating the display data of pixels in the frame buffer in accordance with the drawing data, which is the intermediate data in the above-mentioned graphics computations. In the rasterization process, one frame is segmented into bands formed of a plurality of lines in order to perform parallel processing by using a plurality of cores (arithmetic elements). As the intermediate data is calculated for each line, the display data of pixels in the frame buffer is calculated for each corresponding line. The intermediate data itself is retained in a single work area for one whole frame. As the vector data for generating the intermediate data are, for example, the coordinates of feature points of a figure, it is convenient that the intermediate data be stored in the work area collectively allocated for one whole frame. The reason is that the order in which the intermediate data is calculated varies with the method of implementing hardware or software for calculating the intermediate data and with an algorithm used therefor because the coordinates of the feature points of a figure are arbitrary within the frame.

Hence, it is not easy to reduce the storage capacity of the work area that stores the intermediate data in graphics computations.

The means for solving the above problem will be described below. Other problems and novel features will become apparent from the following description and from the accompanying drawings.

One aspect of the present invention is described below.

In summary, when graphics computations are to be performed to calculate the display data of a figure to be drawn within a frame that is formed of a plurality of lines in accordance with input vector data, the frame in which the figure is to be displayed is segmented into a plurality of drawing areas for each of the lines. As regards the work area for storing the intermediate data, the same work area is allocated to all the drawing areas. The graphics computations for calculating the intermediate data of the individual drawing areas are sequentially performed by repeatedly using the same work area.

An advantage provided by the one aspect of the present invention is briefly described below.

As one work area is repeatedly used for graphics computations in which the intermediate data of each segmented drawing area is calculated, the storage capacity of the RAM to which the work area is allocated can be reduced.

BRIEF DESCRIPTION OF THE DRAWINGS

FIGS. 7A and 7B are diagrams illustrating an example in which a work area is changed as indicated in FIG. 6.

DETAILED DESCRIPTION

1. Overview of Embodiments

Figure 1:
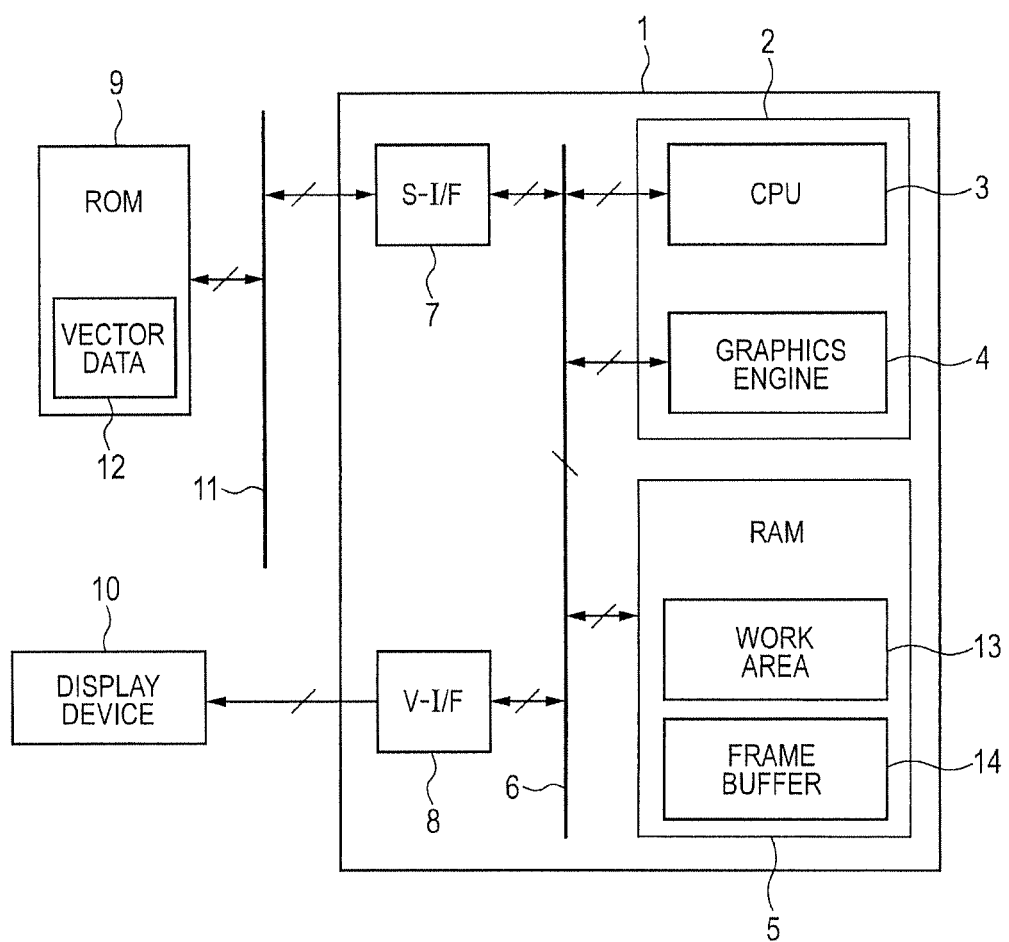
FIG. 1 is a block diagram illustrating an exemplary configuration of an image processing LSI according to an embodiment of the present invention and an exemplary configuration of an image processing device that uses the image processing LSI.

First of all, embodiments representative of the present invention disclosed in this document will be summarized. The parenthesized reference numerals in the accompanying drawings referred to in the overview of the representative embodiments merely illustrate what is contained in the concept of elements to which the reference numerals are affixed.

[1]<Image Processing LSI—Segmenting a Drawing Area and Reusing the Same Work Area>

According to one aspect of the present invention, there is provided an image processing LSI (1) that is capable of performing graphics computations for calculating the display data of a FIG. 22, 23) to be drawn within one frame (20) formed of a plurality of lines in accordance with input vector data (12). The image processing LSI (1) is configured as described below.

The image processing LSI (1) includes a graphics computation section (2) and a storage section (e.g., a RAM) (5). The graphics computation section (2) is capable of performing the graphics computations. The storage section (5) includes a work area (13) for storing intermediate data for the graphics computations and is accessible from the graphics computation section.

The graphics computation section segments the frame, which displays the figure, into a plurality of drawing areas (21) for each of a plurality of lines, and sequentially performs the graphics computations on each of the drawing areas.

As regards the graphics computations on each of the drawing areas, the graphics computation section allocates the same work area (13) of the storage section to all the drawing areas in order to store the intermediate data.

Consequently, the storage capacity required for the work area in the storage section can be reduced.

[2]<Defining the Size of Segments of the Drawing Areas in Accordance with the Size of the Work Area>

According to another aspect of the present invention, there is provided the image processing LSI as described in [1] above. The graphics computation section calculates the number of lines forming the drawing areas in accordance with a predetermined storage capacity allocated to the work area.

Consequently, the work area can be allocated to the storage section that is formed as an on-chip element on the image processing LSI and provided with a limited storage capacity.

[3]<2D Vector Graphics>

According to another aspect of the present invention, there is provided the image processing LSI as described in [1] above. The one frame is formed of the lines having a plurality of pixels. The intermediate data includes coordinate data of pixels indicative of the positions of all edges of each line of the figure. The work area is capable of storing the intermediate data of the lines.

The graphics computation section allocates a storage capacity being defined in accordance with the product of the number of lines to be stored and the maximum number of edges of each line within the one frame, to the work area in the storage section.

Consequently, the storage capacity of the work area, for example, in OpenVG-compliant 2D vector graphics can be accurately calculated.

[4]<Size of the Segments of the Drawing Areas in 2D Vector Graphics>

According to another aspect of the present invention, there is provided the image processing LSI as described in [3] above. The graphics computation section calculates the number of lines forming the drawing areas in accordance with the predetermined storage capacity allocated to the work area (step 34).

Consequently, the work area can also be allocated to the storage section that is formed as an on-chip element on the image processing LSI and provided with a limited storage capacity, for example, in OpenVG-compliant 2D vector graphics.

[5]<Graphics Engine Plus CPU (Central Processing Unit)>

According to another aspect of the present invention, there is provided the image processing LSI as described in any one of [1] to [4] above. The graphics computation section includes a graphics engine (4) and a CPU (3). The graphics engine (4) can input the vector data and output the intermediate data. The CPU (3) can control the graphics engine.

Consequently, graphics computations can be performed at high speed.

[6]<Image Processing Program—Segmenting a Drawing Area and Reusing the Same Work Area>

According to another aspect of the present invention, there is provided an image processing program (30) that is capable of perforating graphics computations for calculating the display data of a FIG. 22, 23) to be drawn within one frame (20) formed of a plurality of lines in accordance with input vector data (12) by using a graphics engine (4), a CPU (3), and a storage section (e.g., a RAM) (5). The image processing program (30) is configured as described below.

The image processing program (30) includes the steps of: allocating a work area (13) for storing intermediate data for the graphics computations to the storage section when executed by the CPU; segmenting the frame, which displays the figure, into a plurality of drawing areas (21) for each of a plurality of lines, inputting the vector data to the graphics engine to sequentially perform the graphics computations on each of the drawing areas, and storing the intermediate data in the same work area for all the drawing areas, the intermediate data being output when the graphics computations are performed on each of the drawing areas.

Consequently, the storage capacity required for the work area in the storage section can be reduced.

[7]<Defining the Size of Segments of the Drawing Areas in Accordance with the Size of the Work Area>

According to another aspect of the present invention, there is provided the image processing program as described in [6] above. The image processing program further includes the step of causing the CPU to calculate the number of lines forming the drawing areas in accordance with a predetermined storage capacity allocated to the work area (step 34).

Consequently, the work area can also be allocated to the storage section that is formed as an on-chip element on an image processing LSI and provided with a limited storage capacity.

[8]<2D Vector Graphics>

According to another aspect of the present invention, there is provided the image processing program as described in [6] above. The one frame is formed of the lines having a plurality of pixels. The intermediate data includes coordinate data of pixels indicative of the positions of all edges of each line of the figure.

The work area is capable of storing the intermediate data of the lines. The image processing program further includes the step of causing the CPU to allocate a storage capacity, which is defined in accordance with the product of the number of lines to be stored and the maximum number of edges of each line within the one frame, to the work area in the storage section.

Consequently, the storage capacity of the work area, for example, in OpenVG-compliant 2D vector graphics can be accurately calculated.

[9]<Size of the Segments of the Drawing Areas in 2D Vector Graphics>

According to another aspect of the present invention, there is provided the image processing program as described in [8] above. The image processing program further includes the step of causing the CPU to calculate the number of lines forming the drawing areas in accordance with the predetermined storage capacity allocated to the work area (step 34).

Consequently, the work area can also be allocated to the storage section that is formed as an on-chip element on the image processing LSI and provided with a limited storage capacity, for example, in OpenVG-compliant 2D vector graphics.

[10]<Calculating the Height (the Number of Lines) of Segmented Drawing Areas>

According to another aspect of the present invention, there is provided the image processing program as described in [9] above. The image processing program further includes the steps of: calculating the number of edges of each line of the figure (step 32); determining the maximum number of edges per line from the calculated number of edges of each line (step 33); and calculating the number of lines in the drawing areas in accordance with the determined maximum number of edges (step 34).

Consequently, the height of segmented drawing areas suitable for the work area having the predetermined storage capacity can be calculated in terms of the number of lines.

[11]<Initializing and Changing the Height of Segmented Drawing Areas>

According to another aspect of the present invention, there is provided the image processing program as described in [9] above. The image processing program further includes the steps of: tentatively determining the number of lines in the drawing areas and the number of edges of each line (step 31); calculating the number of edges of each line of the figure (step 32); determining the maximum number of edges per line from the calculated number of edges of each line (step 33); and changing the tentatively determined number of lines in the drawing areas in accordance with the determined maximum number of edges (step 36).

Consequently, the height (the number of lines) of segmented drawing areas suitable for the work area having the predetermined storage capacity can be properly adjusted for each figure to be drawn.

[12]<Calculating the Number of Edges within the Confines of a Circumscribing Rectangle>

According to still another aspect of the present invention, there is provided the image processing program as described in [10] or [11] above. The image processing program further includes the step of, after the step of calculating the number of lines in the drawing areas in accordance with the determined maximum number of edges, calculating the intermediate data of each of all the drawing areas and storing the calculated intermediate data in the work area (step 37). The above step (step 37) is performed merely within the confines of a rectangle (24) circumscribing the figure.

Consequently, the computation time required for image processing can be shortened.

2. Details of Embodiments

Embodiments of the present invention will now be described in further detail.

First Embodiment <Image Processing LSI>

FIG. 1 is a block diagram illustrating an exemplary configuration of the image processing LSI according to an embodiment of the present invention and an exemplary configuration of an image processing device that uses the image processing LSI.

The image processing LSI 1 according to a first embodiment of the present invention is capable of performing graphics computations to calculate the display data of a figure to be drawn within one frame formed of a plurality of lines in accordance with input vector data 12. For example, a display device 10 and a nonvolatile memory (ROM) 9 are coupled to the image processing LSI 1. The ROM 9 which stores the vector data 12 and the like is coupled to the image processing LSI 1 through an external bus 11. For example, a flash memory (registered trademark) may be used as the ROM 9. Further, the ROM 9 may also store a program for operating the image processing LSI 1. The image processing LSI 1 is configured so that a graphics computation section 2, a storage section 5 such as a RAM, a system interface 7, and a video interface 8 are interconnected through a bus 6. A work area 13 and a frame buffer 14 are allocated to the RAM 5. The video interface 8 is an interface circuit for coupling to the external display device 10. The graphics computation section 2 performs graphics computations in accordance with the input vector data 12 and stores the intermediate data in the work area 13 allocated to the RAM 5.

The graphics computation section 2 segments the frame, which displays a figure drawn in accordance with the vector data 12, into a plurality of drawing areas for each of a plurality of lines. The same work area 13 is allocated to all the segmented drawing areas. When sequentially performing graphics computations on each of the segmented drawing areas, the graphics computation section 2 repeatedly uses the same work area 13 to store the intermediate data of each drawing area.

Consequently, the storage capacity required for the work area in the RAM 5 can be reduced.

Operating principles of the image processing LSI 1 according to the first embodiment will now be described.

Figure 2:
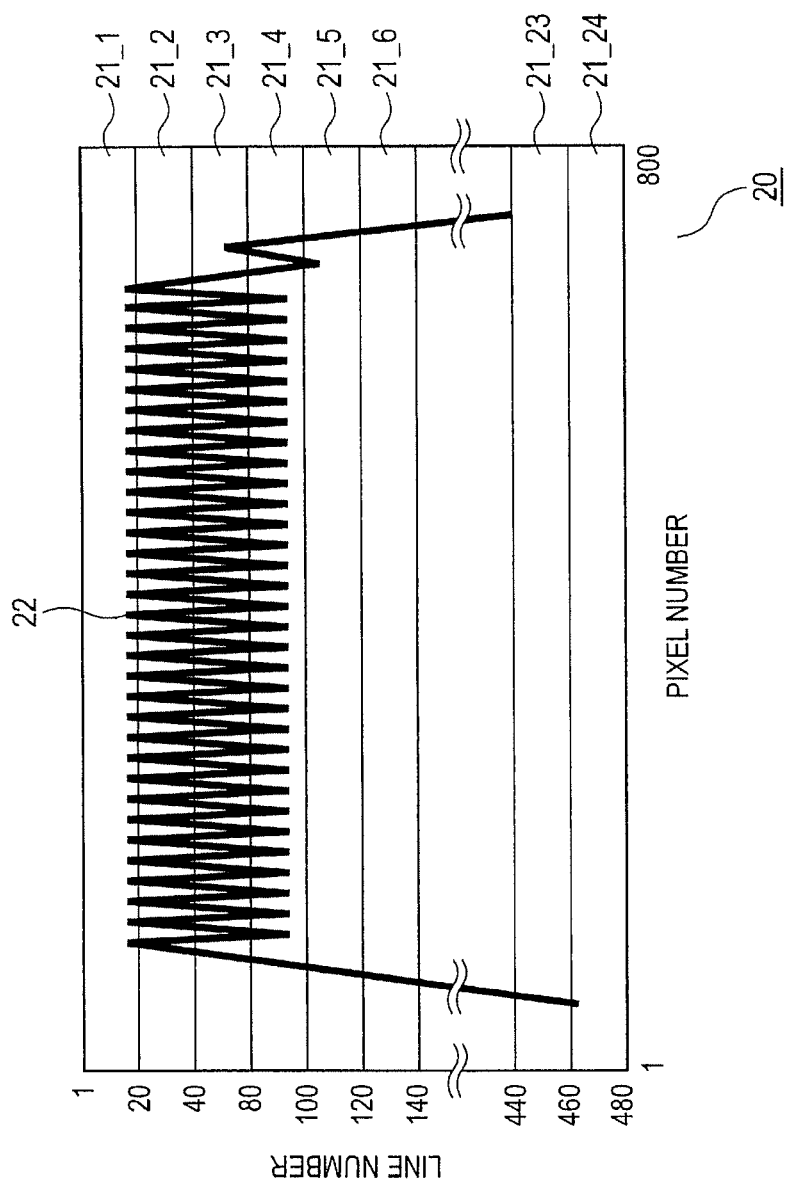
FIG. 2 is a diagram illustrating an operation performed to draw line segments.
Figure 3:
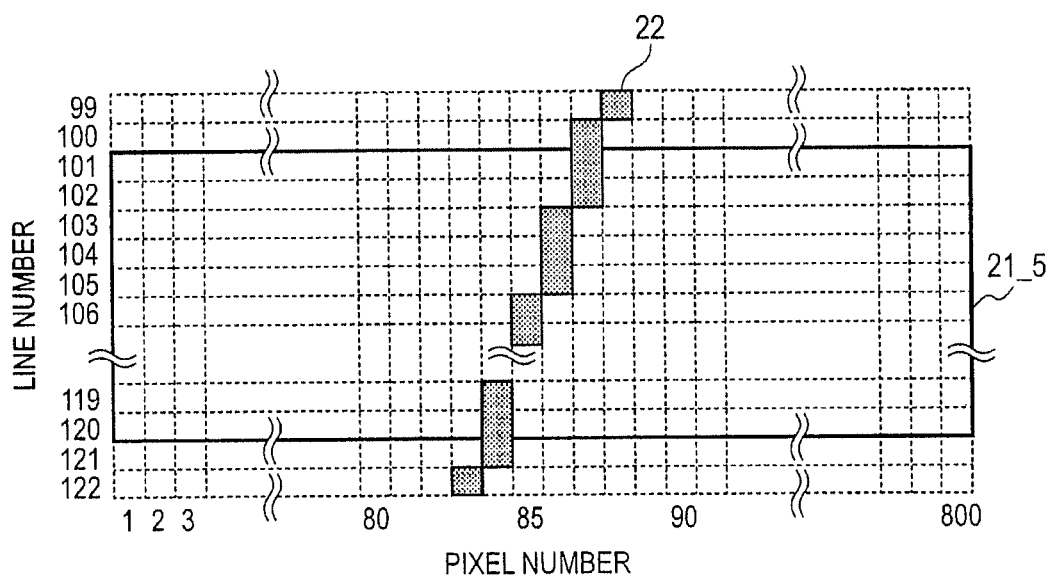
FIG. 3 is a partially enlarged view of FIG. 2.

FIG. 2 is a diagram illustrating an operation performed to draw line segments. FIG. 3 is a partially enlarged view of FIG. 2. FIGS. 2 and 3 exemplify a case where a FIG. 22 formed of a plurality of line segments is to be drawn within a frame 20. The vertical axis represents a line number and the horizontal axis represents a pixel number. As is the case with the description given under "SUMMARY," FIGS. 2 and 3 exemplify a situation where the size of an image to be displayed is 480×800 Wide VGA. In this instance, as explained earlier, a primary means for complying with the specifications for OpenVG calculates the storage capacity required for the work area in accordance with the maximum number of edges. The edges each denote an intersection between a drawn line segment and a line forming the frame. As exemplified in FIG. 3, the drawn line segments intersect with the lines forming the frame. The edge of line number 101 is 87. The edge of line number 102 is also 87. The edges of line numbers 103 to 105 are 86. The position of the edge of each line is calculated. As shown in FIG. 2, the number of edges per line varies with the complexity of the figure. When drawing one figure, the primary means for complying with the specifications for OpenVG defines the size of the work area for storing the intermediate data of all lines in a field in accordance with the maximum number of edges per line, that is the number of edges of a line having the maximum number of edges. The size per line is calculated by earlier-mentioned Equation (1). The storage capacity of the work area for one whole field is calculated by earlier-mentioned Equation (2).

According to the first embodiment, the frame 20 is segmented into a plurality of drawing areas 21. FIG. 2 shows an example in which each drawing area has 20 lines and the frame 20 is segmented into 24 drawing areas 21_1 to 21_24. A storage area for storing 20 lines of intermediate data is allocated as the work area 13 in the RAM 5. If it is assumed that the maximum number of edges is 68, as is the case with the description given under "SUMMARY," the size per line is the same 192 bytes. According to the first embodiment, however, the work area required for one drawing area is as small as 20 lines. Therefore, the storage capacity required for the work area 13 is 15,360 bytes (15 kilobytes). This storage capacity is as small as one twenty-fourth of a former storage capacity of 368,640 bytes (360 kilobytes), which is used for collective allocation of one whole frame.

The same also holds true when a two-dimensional figure is to be drawn instead of a line segment.

Figure 4:
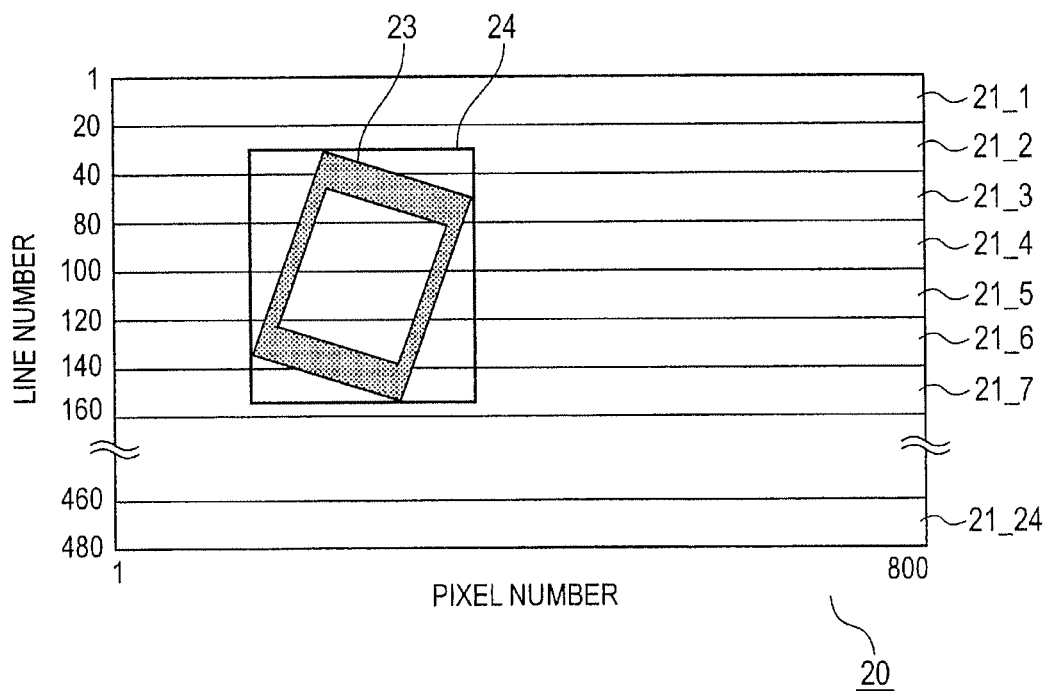
FIG. 4 is a diagram illustrating an operation performed to draw a rectangle.
Figure 5:
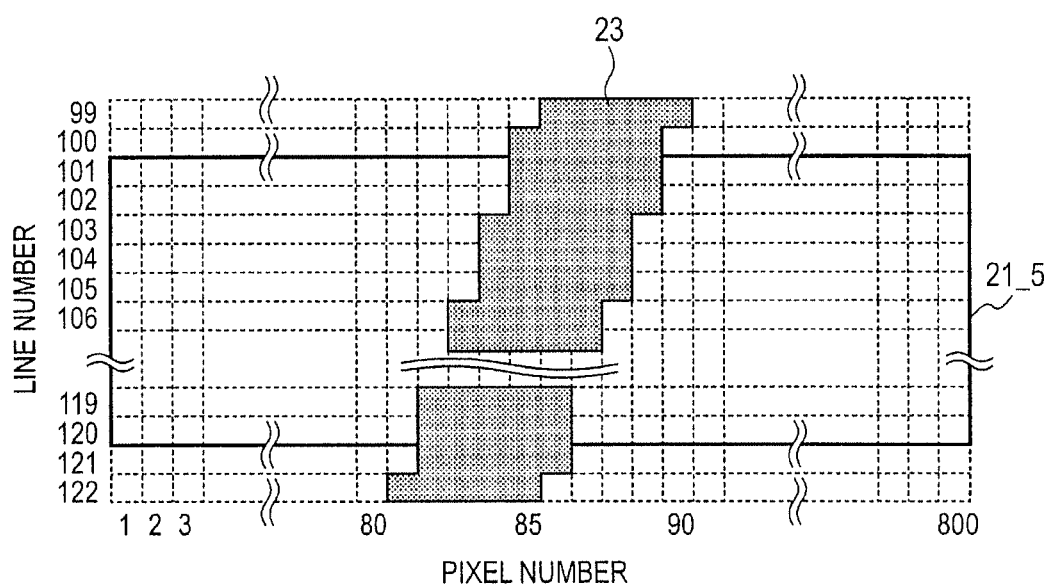
FIG. 5 is a partially enlarged view of FIG. 4.

FIG. 4 is a diagram illustrating an operation performed to draw a rectangle. FIG. 5 is a partially enlarged view of FIG. 4. FIGS. 4 and 5 exemplify a case where a FIG. 23 formed of a plurality of two-dimensional figures is to be drawn within the frame 20. The vertical axis represents the line number and the horizontal axis represents the pixel number. If the figure to be drawn is a line segment having no width, an intersection between the line segment and the line is regarded as an edge. If, on the other hand, the figure to be drawn is two-dimensional figure having a width, coordinates for inverting drawing data when pixels in each line are viewed in the order from the lowest pixel number to the highest should be regarded as an edge. As regards a line having line number 101, pixels having pixel numbers up to 84 are white, pixels having pixel numbers 85 to 89 are black, and pixels having pixel numbers 90 and beyond are white. Therefore, the intermediate data should be determined with pixel numbers 85 and 90 regarded as an edge. The edges should be defined in such a manner as to maintain consistency with respect to a computation process that calculates the display data from the intermediate data. The definition of an edge needs to be adjusted more or less depending on whether the figure to be drawn is a line segment having no width or a two-dimensional figure having a width. However, the storage capacity required for the work area can be calculated in accordance with the number of edges in either of the above two cases.

In the above example, the storage capacity of the work area 13 is calculated from the number of segmented drawing areas within a frame. Conversely, the storage capacity of the RAM 5, which can be allocated to the work area 13, can be predefined to backward calculate the amount of intermediate data that can be stored in the work area 13 having such a storage capacity to calculate the number of segmented drawing areas, that is, the number of lines in the segmented drawing areas 21.

Consequently, the work area 13 can be allocated to the RAM 5 that is formed as an on-chip element on the image processing LSI 1 and provided with a limited storage capacity.

The embodiment of the image processing LSI 1 will now be described in further detail.

The image processing LSI 1 is not particularly limited to, but is formed on a single silicon substrate by using a well-known CMOS (Complementary Metal-Oxide-Semiconductor field effect transistor) LSI manufacturing technology.

The graphics computation section 2 may include a graphics engine 4 and a CPU 3. When the vector data 12 is input, the graphics engine 4 can calculate the intermediate data. The CPU 3 can control the graphics engine 4. This makes it possible to rapidly perform graphics computations. An MPU (Micro-Processing Unit), an MCU (Micro-Controller Unit), or any other processor may be used as the CPU 3. The graphics engine 4 is, for example, a hardware accelerator for calculating the intermediate data from the vector data 12, and may be formed by a programmable processor.

The image processing LSI 1 may include another functional module. If, for instance, the image processing LSI 1 includes a DMA (Direct Memory Access) controller, the display data can be transferred from the frame buffer 14 to the video interface 8 and displayed on the display device 10 in the background of a programmed operation by the CPU. In this instance, the image processing LSI 1 also needs to include a bus arbitration circuit that arbitrates access to the bus 6.

The ROM 9 need not always be provided as an external device. Instead, it may be provided as an on-chip ROM that is coupled to the bus 6 in the image processing LSI 1. This configuration makes it possible to reduce the circuit scale by excluding the system interface 7, reduce the number of terminals by excluding a terminal for coupling to the external bus, and reduce the size of a package in which the image processing LSI 1 is mounted.

Meanwhile, it is possible to use a configuration in which an additional external RAM is coupled to the external bus 11 and a frame buffer is allocated to the external RAM to transfer the display data directly from the external RAM to the display device 10. This configuration results in cost reduction if allocating a frame buffer to an on-chip RAM is costly in a situation where a high-definition display device is used.

Second Embodiment <Image Processing Program>

An image processing program 30 according to a second embodiment of the present invention will now be described. The image processing program 30 is capable of performing graphics computations to calculate the display data of FIGS. 22, 23 to be drawn within one frame 20, which is formed of a plurality of lines, in accordance with input vector data 12 by using the graphics engine 4, the CPU 3, and the storage section (e.g., RAM) 5.

When executed by the CPU 3, the image processing program 30 allocates the work area 13, which stores the intermediate data for graphics computations, to the RAM 5 and segments the frame 20, which displays the FIGS. 22, 23, into a plurality of drawing areas 21 for each of a plurality of lines. The image processing program 30 inputs the vector data 12 to the graphics engine 4 and causes the graphics engine 4 to sequentially perform graphics computations on each drawing area 21 included in the drawing areas 21. The image processing program 30 operates so that the intermediate data output as a result of the graphics computations on each drawing area is stored in the same work area 13.

Consequently, the storage capacity required for the work area in the storage section can be reduced.

An exemplary operation performed by the image processing program 30 according to the second embodiment will now be described in further detail.

Figure 6:
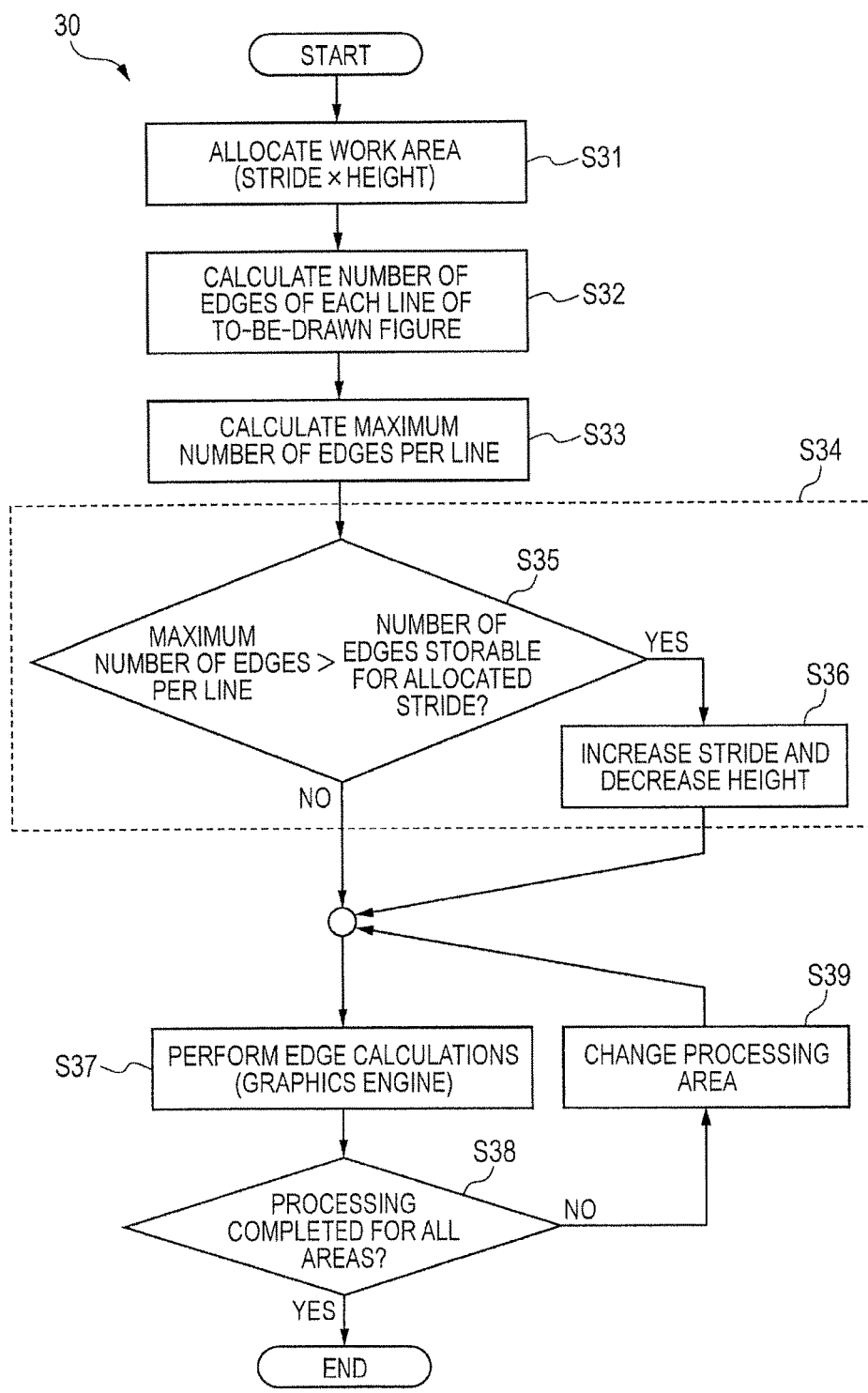
FIG. 6 is a flowchart illustrating an exemplary operation performed by an image processing program according to an embodiment of the present invention.

FIG. 6 is a flowchart illustrating an exemplary operation performed by the image processing program according to the second embodiment.

In step 31, the work area 13 in an initial state is allocated by tentatively determining the number of lines (height) of the drawing areas and the number of edges of each line and determining the storage capacity (stride) per line that permits the storage of intermediate data corresponding to the number of edges. Next, in step 32, the number of edges per line of the FIGS. 22, 23 to be drawn is calculated. This step is accomplished, for instance, by inputting the vector data 12 of the to-be-drawn FIGS. 22, 23 to the graphics engine 4 and permitting the graphics engine 4 to perform calculations. In accordance with the result of the calculations, in step 33, the maximum number of edges per line, that is, the number of edges of a line having the maximum number of edges is calculated. Next, in step 34, the number of lines in the drawing areas is calculated in accordance with the calculated maximum number of edges to change the number of lines (height) of the drawing areas, which was tentatively determined in step 31. This makes it possible to allocate the work area 13 having an appropriate size (storage capacity) for each figure to be drawn. In 2D vector graphics, the intermediate data of each of many to-be-drawn figures is generated, and the generated sets of intermediate data are synthesized to obtain the display data. Therefore, the size of the work area can be properly set each time the to-be-drawn figure is changed. After a proper work size is set, edge calculations are performed, in step 37, on each segmented drawing area. For example, the vector data 12 of the to-be-drawn FIGS. 22, 23 can be input to the graphics engine 4 to permit the graphics engine 4 to perform calculations.

As a matter of course, the vector data 12 is not subjected to area segmentation. Therefore, if the graphics engine 4 of a related-art type is used as is, it calculates the intermediate data of one whole frame. In such an instance, the work area 13 stores only the intermediate data about a drawing area to be processed. The intermediate data about the other drawing areas is discarded. When, on the other hand, the graphics engine 4 is configured to be capable of performing computations to calculate the intermediate data about only an area designated to be calculated, the edge calculations can be performed in step 37 within shorter computation time while the amount of computations is reduced.

In step 38, it is determined whether the edge calculation process (step 37) is completed for all the segmented drawing areas 21. A processing area is changed in step 39 so as to repeatedly perform the edge calculation process (step 37) on each unprocessed drawing area 21 that is not subjected to the edge calculation process (step 37). When all areas within one frame 20 are completely processed, processing comes to an end.

In step 34, an alternative is to limit the storage capacity allocatable to the work area 13 to a predetermined storage capacity in advance and calculate the number of lines forming each drawing area segment 21. More specifically, in step 35, the maximum number of edges per line, which was calculated in step 33, may be compared to the number of edges that can be stored by using the storage capacity per line (stride), which was allocated in step 31. If the result of the comparison indicates that the former is larger than the latter, step 36 may be performed to increase the storage capacity per line (stride) and decrease the number of lines (height) of the drawing areas. The storage capacity of the work area 13 is then equal to the product of the storage capacity per line (stride) and the number of lines (height) of the drawing areas. Hence, the storage capacity of the work area 13 should be adjusted until it remains equal to a predetermined limited storage capacity.

An exemplary change in the work area 13 will now be described with reference to FIGS. 7A and 7B. FIGS. 7A and 7B are diagrams illustrating an example in which the work area is changed as indicated in FIG. 6. Let us assume, for example, that, in step 31, a 7,680-byte (7.5-kilobyte) area, which is defined by a stride S0 for 64 edges and by a height H0 for 40 lines, is allocated as the work area as indicated in FIG. 7A. If the maximum number of edges calculated in step 33 was, for example, 100, which is larger than an assumed value of 64, the stride is increased twofold (stride=S1=S0× 2) and the height (the number of lines in the drawing areas) is reduced to one-half (height=H1=H0/2) in inverse proportion to the stride, as indicated in FIG. 7B. The size of the work area obtained after the change is the same 7,680 bytes (7.5 kilobytes) as the initial size.

Consequently, the work area 13 can also be properly allocated to the storage section (RAM) 5 that is formed as an on-chip element on the image processing LSI 1 and provided with a limited storage capacity.

In the embodiment described with reference to FIG. 6, the edge calculation process (step 37) is performed on all the segmented drawing areas 21. However, if, for instance, the to-be-drawn FIG. 23 is small and existing in a limited area of a frame as shown in FIG. 4, the step 37 in which the intermediate data is calculated and stored in the work area 13 may be performed only on the drawing areas 21_2 to 21_7 including the rectangle 24 circumscribing the FIG. 23. This makes it possible to shorten the computation time required for image processing. The circumscribing rectangle 24 is defined by the to-be-drawn figure's maximum and minimum coordinates in the horizontal direction (in a pixel number direction) and in the vertical direction (in a line number direction). The graphics engine 4 may be configured to be capable of calculating the circumscribing rectangle 24 from the input vector data 12.

While the present invention contemplated by its inventors has been described in detail in terms of preferred embodiments, it is to be understood that the present invention is not limited to those preferred embodiments, but extends to various modifications that nevertheless fall within the spirit and scope of the appended claims.

For example, the present invention is applicable to an image processing LSI coupled to a display device of any size as far as the storage capacity per line (stride) of the work area 13 and the number of lines (height) of the drawing areas are adjusted in accordance with the coupled displayed device.

What is claimed is:

1. A large-scale integrated circuit (LSI) for image processing configured to perform graphics computations for calculating display data of a figure to be drawn within one frame formed of a plurality of lines in accordance with input vector data, the LSI comprising:
    a graphics computation section configured to perform the graphics computations; and
    a storage section that includes a work area, with a predetermined storage capacity, for storing intermediate data for the graphics computations and is accessible from the graphics computation section,
    wherein the graphics computation section is configured to segment the frame into a plurality of drawing areas each containing a group of the plurality of lines, and sequentially perform the graphics computations on each of the drawing areas,
    as regards the graphics computations on each of the drawing areas, the graphics computation section is configured to allocate the same work area of the storage section to all the drawing areas in order to store the intermediate data,
    the one frame is formed of the lines having a plurality of pixels,
    the intermediate data includes coordinate data of pixels indicative of the positions of all edges of each line of the figure,
    the work area stores the intermediate data of the lines of the figure, and
    the graphics computation section calculates the number of lines forming the one of the drawing areas in accordance with the predetermined storage capacity allocated to the work area and a maximum number of edges of each line within the one frame.

2. A non-transitory computer readable medium storing an image processing program for performing graphics computations for calculating display data of a figure to be drawn within one frame formed of a plurality of lines in accordance with input vector data, the image processing program, when executed by a central processing unit (CPU), causing the CPU to perform steps of:
    allocating a work area for storing intermediate data for the graphics computations to a memory;
    segmenting the frame into a plurality of drawing areas each containing a group of the plurality of lines;
    inputting the vector data to a graphics engine to sequentially perform the graphics computations on each of the drawing areas;
    causing the same work area to store the intermediate data for all the drawing areas, the intermediate data being output when the graphics computations are performed on each of the drawing areas; and
    calculating the number of lines forming the one of the drawing areas in accordance with a predetermined storage capacity allocated to the work area and a maximum number of edges of each line within the one frame, wherein:
    the one frame is formed of the lines having a plurality of pixels,
    the intermediate data includes coordinate data of pixels indicative of the positions of all edges of each line of the figure,
    the work area stores the intermediate data of the lines of the figure.

3. The LSI of claim 1, wherein the LSI is a CMOS chip made of a single silicon substrate.

* * * * *